INVENTOR
Ralph K. Dean
BY Bacon & Thomas
ATTORNEYS

INVENTOR
Ralph K. Dean
BY Bacon & Thomas
ATTORNEYS

June 4, 1968  R. K. DEAN  3,386,460
SPRINKLER SYSTEM WITH AUTOMATIC PRESSURE RELIEF VALVE
Filed Feb. 1, 1965  5 Sheets-Sheet 5

INVENTOR
Ralph K. Dean
BY Bacon & Thomas ATTORNEYS

United States Patent Office 3,386,460
Patented June 4, 1968

3,386,460
**SPRINKLER SYSTEM WITH AUTOMATIC
PRESSURE RELIEF VALVE**
Ralph K. Dean, Costa Mesa, Calif., assignor to
Donald G. Griswold, Newport Beach, Calif.
Filed Feb. 1, 1965, Ser. No. 429,293
14 Claims. (Cl. 137—218)

This invention relates to fluid distribution systems and particularly to an improved system for the distribution of water from a source of supply to a plurality of pipes, for example, pipes in a lawn sprinkler system, and wherein the pressure in the system is relieved at all times when the system is not in use, without completely draining the system so that no appreciable watering time is lost when the system is restarted.

At the present time, automatic sprinkling systems for lawns and the like usually include a plurality of sprinkler pipes, each provided with a number of sprinkler heads. It often happens that the number of sprinkler heads required to water large areas is so great that the water distribution pipes, which connect the main water supply line to the sprinkler pipes, are unable to supply water in sufficient volume and under sufficient pressure to operate all of the sprinklers in the system at the same time. In such instances, a fluid actuated, flow control valve is connected between each sprinkler pipe and its associated water distribution pipe; and a pilot valve, which is actuated at preselected intervals of time by a sprinkler programming controller, controls the flow of operating fluid to and from each of the flow control valves in such a manner that they are actuated successively one at a time to supply water under full pressure to the respective sprinkler pipes. At the end of a sprinkling cycle, all of the flow control valves are closed.

In conventional sprinkling systems, the water distribution pipes, which extend from the main water supply pipe to the sprinkler pipes, as above-mentioned, are normally maintained under the full pressure of the supply main at all times, and this "locked in" pressure requires that the distribution pipes be sufficiently strong and of a heavy enough gauge to withstand full pressure, particularly during periods when the sprinkling system is under pressure but not in operation.

The present invention avoids the undesirable maintaining of full pressure in the distribution pipes, in that it provides a distribution system for water wherein flow through the main supply pipe is shut off by the automatic closing of a master valve, and the pressure in the distribution pipes is vented to the atmosphere by the automatic opening of a pressure relief valve at the end of a watering cycle, i.e., whenever the sprinkling system is not in operation. This prevents rupturing of the distribution pipes and resulting flooding during off-hour, or non-sprinkling periods, and permits the employment of lighter-weight and more economical pipes in the water distribution system. An automatic vacuum breaker valve is preferably associated with the pressure relief valve to avoid a vacuum condition in the distribution pipes. The invention further provides for the automatic closing of the relief and vacuum breaker valves whenever the master valve is opened to initiate a watering cycle. The master valve and the relief valve are under the direct control of a pilot valve and are connected with and controlled by the pilot valve so that when the master valve is closed, the relief valve is open, and vice versa.

It is therefore an object of this invention to provide a water distribution system in which the main distribution pipe and any laterals connected thereto are subjected to pressure only during use of the system and, therefore, may comprise low pressure, low cost piping.

Another object is to prevent the rupturing of, and resultant flooding from the water distribution pipes of a sprinkler system during periods when the system is not in operation.

A more particular object is to provide control means for a fluid distribution system which automatically cuts off the supply of water and vents the distribution system to the atmosphere at the end of each operating cycle.

A further object is to provide a water distribution system in which the distribution pipes, as defined herein, are automatically vented to atmosphere and relieved of hydraulic pressure during the "Off" periods of the system.

An additional object is to provide a lawn sprinkling system in which a relief valve automatically relieves the pressure in the distribution lines between a master valve and the flow control valves in the respective sprinkler lines whenever the master valve is closed, without completely draining the distribution lines.

Another object is to provide a water distribution system whose principal components can be operated either hydraulically or electrically.

It is a specific object of this invention to provide a water distribution system for a plurality of sprinkler pipes in which the flow control valves connected to the sprinkler pipes are automatically and sequentially permitted to open for a predetermined period of time and are then closed and maintained closed at the end of each operating cycle, while the water distribution pipe system connecting the flow control valves with the main supply of water under pressure, is vented to atmosphere and relieved of pressure during the "Off" periods.

It is also an object to provide a water distribution system in which only a single vacuum breaker valve is required and wherein the vacuum breaker valve opens each time the system has operated through a watering cycle. This avoids the problem of the valve disc sticking to the valve seat, and is common when a vacuum breaker valve is held in its closed position over long periods of time.

Another important object is to provide an improved water distribution system that can readily be adapted to existing water distribution systems, whether they be residential, institutional or commercial.

These and other objects and advantages of the present invention will become obvious from the following description taken in conjunction with the accompanying drawings, in which.

Figure 1:
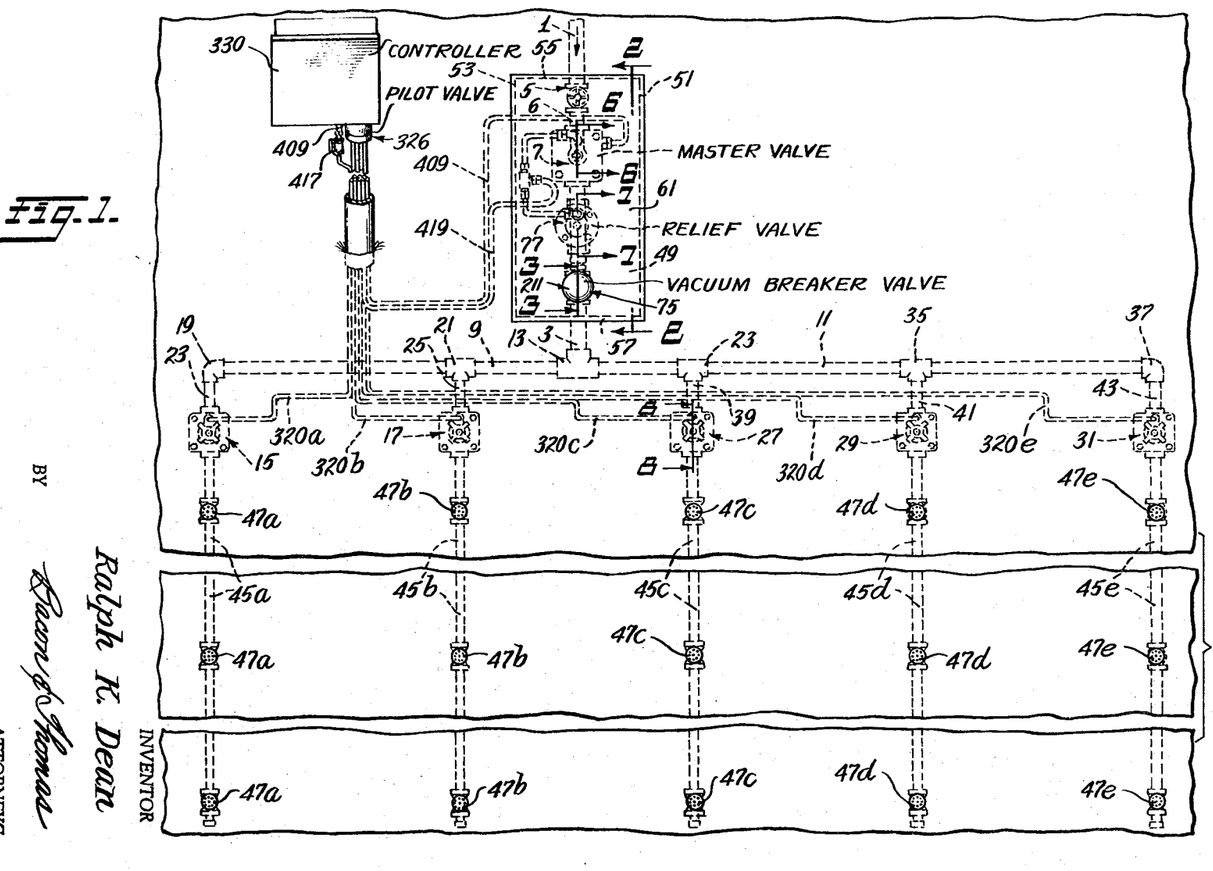
FIG. 1 is a diagrammatic plan view illustrating a preferred arrangement of the controller and pilot valve in relation to the master, relief, and vacuum breaker valves associated with underground piping and sprinkler heads in a lawn area for effecting successive watering of different portions of said area.
Figure 2:
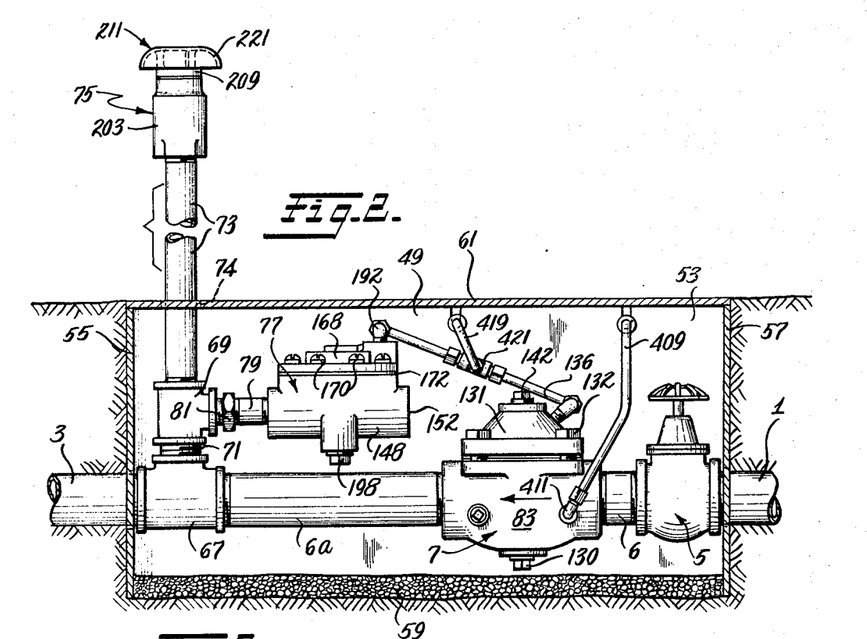
FIG. 2 is an enlarged fragmentary, vertical, sectional view taken on line 2—2 of FIG. 1, illustrating in elevation the arrangement of the master, relief, and vacuum breaker valves.

As is illustrated in FIG. 1, the pipes, conduits, tubing, valves, etc., shown in dotted lines are disposed beneath the surface of the ground in the customary manner. A supply pipe 1 for water under pressure is connected to a main distribution pipe 3. A normally open, manually operated valve 5, FIG. 2, is connected to the supply pipe 1 and a pipe nipple 6 connects the valve 5 to the inlet of a fluid pressure-actuated, master valve 7, the outlet of which in turn is connected to one end of the main distribution pipe 3 through a long nipple 6a and a pipe T 67. A pair of laterally extending water distribution pipes 9 and 11 is connected to the other end of the distribution pipe 3 by a pipe-T 13. Flow control valves 15 and 17 are connected to an elbow fitting 19, and a T-fitting 21, respectively, connected in the lateral distribution pipe 9, by short pipes 23 and 25, resepectively, while flow control valves 27, 29 and 31 are connected to T-fittings 33 and 35 and elbow 37, respectively, connected in the lateral distribution pipe 11, by short pipes 39, 41 and 43, respectively. It will be understood that the length of the distribution pipes 3, 9, 11, 23, 25, etc., will vary with the requirements of each installation.

Watering or spray pipes 45a, 45b, 45d and 45e are connected to the respective flow control valves 15, 17, 27, 29 and 31, and each of these pipes is provided with series of spray nozzles 47a, 47b, 47c, 47d and 47e, which are located at the surface of the ground in position to water the surrounding area.

A rectangular-shaped pit or valve chamber 49, having side walls 51 and 53 and end walls 55 and 57, is recessed into the ground and has a gravel bottom 59 in order to provide adequate drainage from the chamber. A cover 61, which is removable to gain access to the interior of the valve chamber 49, is employed to protect the valves contained therein from damage and to prevent dirt and other debris from falling into the chamber. The water supply pipe 1 extends into the chamber 49 through the end wall 55, and the gate valve 5 is mounted on the end of the supply pipe 1 within said chamber for easy access when the cover 61 is removed. The portion of the main distribution pipe 3 disposed within the chamber 49 has a pipe-T 67 connected therein. A T-fitting 69, located above the pipe-T 67 and connected thereto by a close nipple 71, supports a vertical vent pipe 73. The vent pipe 73 is threaded into the upper end of the T-fitting 69 and extends upwardly therefrom through a suitable opening 74 in the cover 61 to an elevation above the highest point of the water distribution system. An automatic vacuum breaker valve 75 is screw-threaded onto the upper end of the pipe 73 to facilitate venting of the system and reestablishing pressure without forming any air pockets in the system. Also mounted in the chamber 49, is a fluid pressure actuated relief valve 77, which is connected to the stem of the T-fitting 69 by a short pipe nipple 79 and a reducing bushing 81 at an elevation above that of the distribution pipes 3, 9 and 11.

The master valve 7 is of a type that is pressure actuated to open and is normally held closed by line pressure and a spring biasing force. This valve is shown in detail in FIG. 6 and includes a hollow body 83 having a threaded inlet opening 85 connected with the supply pipe 1 through the nipple 6 and shutoff valve 5. The interior of the body 83 is divided into an inlet chamber 87 and an outlet chamber 89 by a partition 91 having a threaded opening 93 therein. A combined valve seat and guide 95 is threaded into the opening 93 and provides an annular, downwardly facing valve seat 97. A cylindrical guide 99 having a cylindrical bore 102 in axial alignment with the valve seat 97 is integrally connected with the valve seat 95 by one or more ribs 104.

Figure 6:
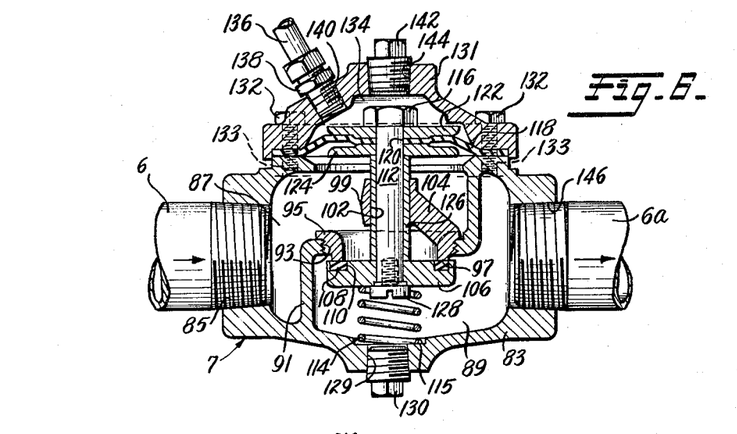
FIG. 6 is an enlarged, fragmentary, vertical, sectional view through the master valve, taken on the line 6—6 of FIG. 1.

A vertically movable valve disc 106 has an annular resilient gasket 108 seated in an annular recess 110 in the upper surface thereof for cooperation with the valve seat 97 and is mounted on the lower end of a valve stem 112. Normally, the valve disc 106 is biased toward its closed position wherein the resilient gasket 108 is seated on the valve seat 97, by a stainless steel coil compression spring 114. One end of the spring 114 is seated against the lower surface of the valve disc 106 and the other end is seated in a recess 115 in the bottom wall of the hollow body 83.

The upper end of the valve stem 112 has an enlargement 116 in the form of a hexagon so that the stem can be held against rotation by a suitable wrench. A resilient diaphragm 118 having an opening 120 is mounted on the upper end of the valve stem 112 and is confined between an upper washer 122, which bears against the enlarged head 116, and a lower washer 124. A tubular spacer 126, which slides freely in the cylindrical bore 102 and closely surrounds the valve stem 112, extends between the lower face of the washer 124 and the upper face of the valve disc 106 and maintains the desired spacing between the diaphragm 118 and the valve disc 106. A screw 128 has an enlarged head which bears against the lower face of the valve disc 106 and is disposed within the upper end of the spring 114 and is mounted in a threaded opening in the lower end of the valve stem 112. The screw 128 tightly clamps the valve disc 106, the tubular spacer 126, the diaphragm washers 122 and 124 and the central portion of the diaphragm 118 in assembled relation. A threaded opening 129, formed in the center of the recess 115 and closed by a removable threaded plug 130, provides access to the screw 128, as well as a drain opening for the outlet chamber 89.

A dome-shaped cover 131 is mounted on the open upper end of the valve body 83 over the diaphragm 118 by a plurality of bolts 132, which pass through suitable openings in the cover 131 and into threaded openings 133 in said valve body. The outer periphery of the diaphragm 118 is clamped between the valve cover 131 and the valve body 83 and provides, with the cover, a pressure chamber 134 for operating fluid. The chamber 134 is connected to a tube or conduit 136 by fitting 138 mounted in a threaded passage 140 extending through the cover 131. A plug 142 is screw-threaded into an opening 144 in the center of the cover 131. The main distribution pipe 3 is threaded into an outlet opening 146 and communicates with the outlet chamber 89 of the master valve 7.

Figures 7, 8:
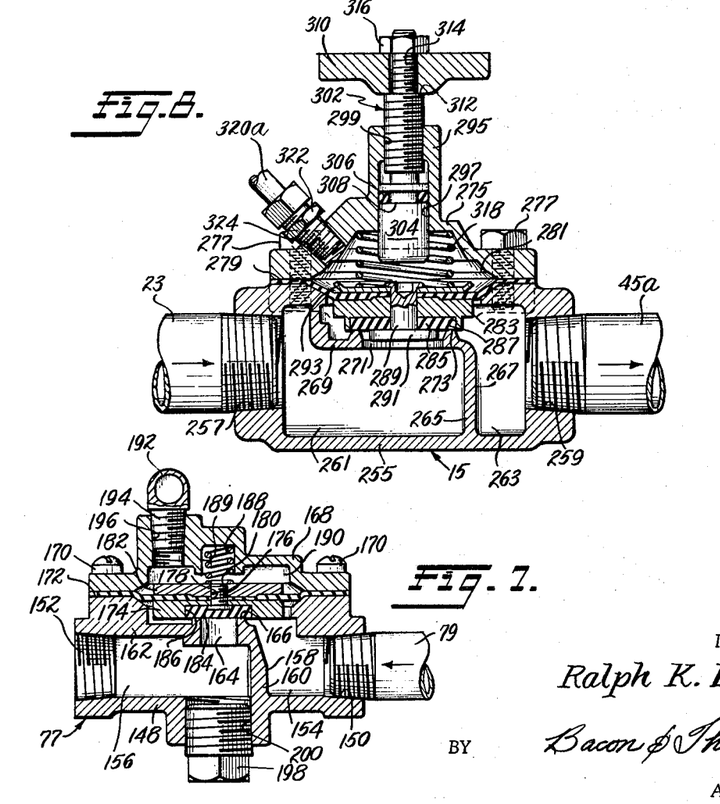
FIG. 7 is an enlarged, fragmentary, vertical, sectional view through the relief valve, taken on the line 7—7 of FIG. 1.
FIG. 8 is an enlarged, fragmentary, vertical, sectional view through one of the sprinkler flow control valves including a manually operable shut-off, taken on the line 8—8 of FIG. 1.

Referring now particularly to FIG. 7, the relief valve 77 is of a type that is spring-biased toward closed position, is pressure actuated to close, and is openable by line pressure in the absence of operating fluid pressure. This valve includes a body portion 148 having a threaded inlet opening 150 connected to the pipe nipple 79 and a threaded outlet opening 152 through which the present fluid distribution system can be vented to the atmosphere. If desired, a nipple or short pipe, not shown, may be connected to the outlet opening 152. The interior of the body 148 is divided into an inlet chamber 154 and an outlet chamber 156 by a partition 158. The partition 158 includes an imperforate vertical wall 160 and a horizontally disposed wall 162, which is provided with a passage 164 connecting the inlet chamber 154 with the outlet chamber 156. The portion of the horizontal wall 162 immediately surrounding the passage 164 extends upwardly for a short distance and provides an annular, upwardly facing valve seat 166.

A dome-shaped cover 168 is mounted on the body 148 by screw threaded fasteners 170, and tightly clamps the periphery of a resilient diaphragm 172 between the upper surface of the body 148 and the cover 168. A disc retainer 174 is disposed against the lower face of the diaphragm 172 at the center thereof and is secured to the diaphragm by a threaded member 176, which extends upwardly from the disc retainer 174 through a suitable opening 178 in the center of the diaphragm 172 and into a threaded opening 180 in the center of a diaphragm washer 182 positioned on the upper face of the diaphragm. A resilient sealing disc 184 is mounted in a recess 186 in the lower face of the disc retainer 174 and cooperates with the valve seat 166 to control the flow of fluid through the relief valve 77. The diaphragm 172 is tightly clamped between the disc retainer 174 and the diaphragm washer 182, and the disc 184 is normally urged toward its closed position by a stainless steel, coiled compression spring 188. One end of the spring 188 is seated in a recess 189 in the cover 168, while the other end of the spring bears against the upper face of the diaphragm washer 182 at the center thereof.

A pressure chamber 190 is provided between the diaphragm 172 and the cover 168. This chamber is connected with a tube 192 by a fitting 194 mounted in a threaded opening 196 in the cover 168. The relief valve 77 can be opened by water under pressure in the inlet chamber 154 acting on the lower face of the disc retainer 174 and the resilient diaphragm 172, against the action of the compression spring 188, in the absence of operating fluid under pressure in the chamber 190. The spring 188 may be calibrated so that the valve 77 will open at a pressure less than atmospheric. The valve 77 is maintained in a closed position by operating fluid under pressure supplied to the chamber 190 through the tube 192 and reacting against the upper side of the diaphragm 172, as will be explained later. A drain plug 198 is mounted in a threaded opening 200 in the body portion 148 directly below the seat opening 164.

Figures 3, 4, 5:
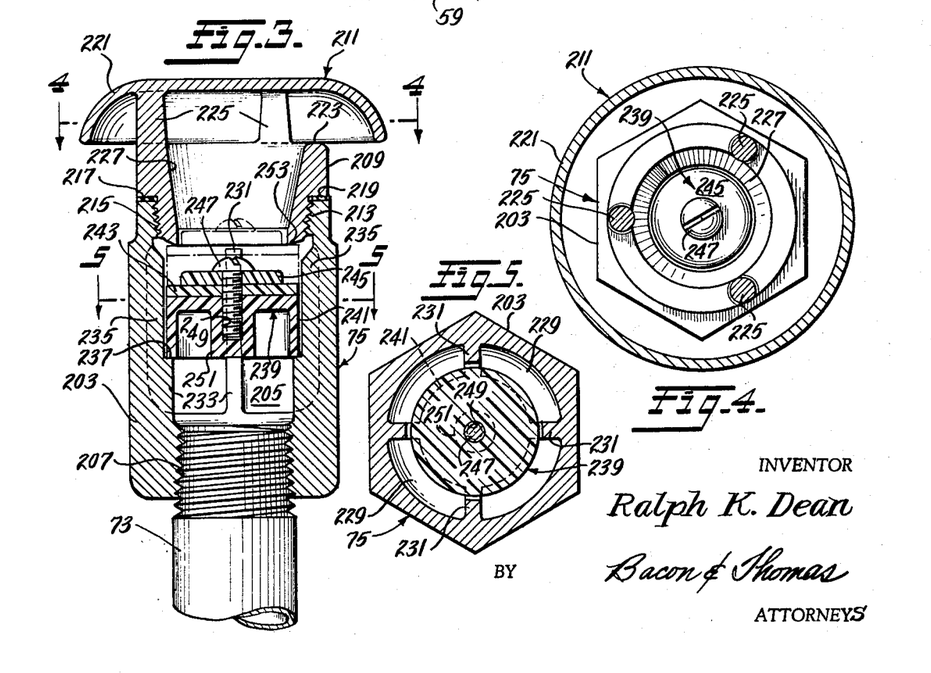
FIG. 3 is an enlarged, fragmentary, vertical sectional view through the vacuum breaker valve, taken on the line 3—3 of FIG. 1.
FIG. 4 is a horizontal, sectional view through the vacuum breaker valve, taken on the line 4—4 of FIG. 3.
FIG. 5 is a horizontal, sectional view through the vacuum breaker valve, taken on the line 5—5 of FIG. 3.

The vacuum breaker valve 75 is illustrated in detail in FIGS. 3, 4 and 5, and includes a body 203 having a hexagonal exterior configuration to provide suitable surfaces to be engaged by the jaws of a wrench. A fluid passage, generally designated 205, extends through the body 203 and is somewhat restricted and provided with threads 207 at the lower end thereof for connecting the body 203 to the upper end of the vent pipe 73. A skirt 209 depending from a mushroom-shaped vent cap 211 is provided at the lower end thereof with threads 213, and is connected to threads 215 in the upper end of the passage 205. A gasket 217 is positioned between the upper end of the body 203 and a shoulder 219 formed on the skirt 209.

A cover portion 221 of the vent cap 211 is made greater in diameter than the skirt 209 and the body 203 in order to prevent foreign matter from falling into the vacuum breaker valve 75. The cover 221 is supported above an upper edge 223 of the skirt 209 by three equally spaced legs 225 formed integral with the skirt and cover. The skirt 209 has a circular passage 227, which is coaxial with the passage 205 in the body 203.

The interior of the body 203 has four equally spaced cavities 229, FIG. 5, separated by four guide ribs 231 that extend radially inwardly a short distance from the bottom wall of the cavities. The guide ribs 231 extend longitudinally of the fluid passage 205 from adjacent the restricted lower end thereof to a point adjacent the upper threads 215. The lower portion 233 of each of the guide ribs 231 extends radially inwardly a slightly greater distance than the upper portion 235 thereof, thus providing a horizontal shoulder 237 spaced from and facing the lower end of the vent cap skirt 209.

A light-weight valve closure assembly 239 is floatingly confined within the body 203 for movement between the shoulder 237 and the lower end of the skirt 209. The valve assembly 239 includes a cylindrical, inverted, cup-shaped element 241, preferably formed of a suitable plastic material, such as "Delrin." The diameter of the valve closure assembly 239 is slightly smaller than the distance between the upper rib portions 235 and is greater than the distance between the lower portions 233. A valve disc 243, formed of Teflon or some other suitable resilient material, is seated on the upper surface of the valve element 241. A guide disc 245, which is smaller in diameter than the valve disc 243 and also slightly smaller than the circular passage 227 in the skirt 209, overlies the valve disc 243. The discs 243 and 245 are attached to the valve element 241 and are maintained concentric therewith by a screw 247 passing through an opening in the center of each of the discs and into a threaded opening 249 in a boss 251 depending from the central portion of the valve element 241.

The exposed upper marginal surface of the valve disc 243 is designed to engage with an annular valve seat 253 formed integrally with the lower end of the skirt 209 when the vacuum breaker valve 75 is closed. The valve closure assembly 239 is guided by, and is freely slidable within, the ribs 231 for vertical movement between an open position seated on the shoulder 237, as shown in solid lines in FIG. 3, and a closed position with the upper marginal surface of the valve disc 243 seated on the annular valve seat 253 and with the guide disc 245 received within the lower end of the passage 227, as shown in phantom lines in FIG. 3.

Due to the light weight of the valve closure assembly 239, it is movable from the open to the closed position by a very low superatmospheric water pressure applied to the lower side thereof and, upon closing, prevents the escape of water under pressure from the vent pipe 73. Prior to closing, the valve assembly 239 will permit air to escape through the vent pipe 73, thus avoiding air pockets in the system. On the other hand, as soon as the hydraulic pressure in the distribution pipe 3 and in the vent pipe 73 is relieved by opening of the relief valve 77, the valve closure assembly 239 automatically drops by gravity and under atmospheric pressure to the open position to vent to the atmosphere the distribution pipe 3 and any other pipes connected in open communication therewith. When the vacuum breaker valve 75 is in the open position, the atmospheric air flows freely through the vacuum breaker valve to relieve any vacuum condition in the main distribution pipe 3 and its associated distribution pipes 9, 11, etc.

The construction and mode of operation of each of the sprinkler flow control valves 15, 17, 27, 29 and 31, is identical and, therefore, only the valve 15 will be described in detail. The valve 15 is of a type that is spring biased toward closed position, is pressure actuated to close and is openable by line pressure in the absence of operating fluid pressure. As is illustrated in FIG. 8, the valve 15 includes a body 255 having a threaded inlet opening 257 connected to one end of the short distribution pipe 23, and a threaded outlet opening 259 connected to the sprinkler pipe 45a. The interior of the valve body 255 is divided into an inlet chamber 261 and an outlet chamber 263 by a partition 265. The partition includes a vertically extending imperforate wall 267 and a horizontal wall 269 having a circular flow passage 271 extending therethrough. The upper surface of the horizontal wall 269 immediately surrounding the flow passage 271 extends upwardly a short distance to provide an annular valve seat 273.

A dome-shaped cover 275 is mounted on the upper surface of the valve body 255 by bolts 277. The peripheral portion of a resilient diaphragm 279, which is clamped between the cover 275 and the valve body 255, defines with the cover 275 a pressure chamber 281 for operating fluid for maintaining the valve in closed position. A valve disc retainer 283, having a resilient valve disc 285 seated in a recess 287 in the lower face thereof, is mounted at the lower side of the diaphragm 279 at the center thereof. A rivet 289 having an enlarged head 291 engaging the lower central portion of the resilient valve disc 285, extends upwardly through aligned openings in the valve disc 285, the valve disc retainer 283, the diaphragm 279, and a diaphragm washer 293 at the upper side of the diaphragm. The upper end of the rivet 289 is swaged over as at 291 to engage the upper surface of the washer 293, and, thus, tightly clamp the diaphragm 279 between the valve disc retainer 283 and the washer 293.

A hollow boss 295, formed on the cover 275 directly above the passage 271, includes a cylindrical bore 297 in the lower portion thereof and a restricted threaded opening 299 at the upper end thereof in axial alignment with the bore 297. A threaded stem 302 is mounted for vertical adjustment in the opening 299 and includes a cylindrical head 304 on the lower end thereof for sliding movement in the bore 297. An O-ring seal 306 is seated in an annular recess 308 formed in the outer wall of the head 304 adjacent the upper end thereof and engages the wall of the bore 297 to prevent the escape of operating fluid from the pressure chamber 281. A handle 310 for rotating and vertically adjusting the stem 302 is seated on a shoulder 312 formed adjacent the upper end of the steam and is secured to the upper threaded end 314 of the stem by a nut 316.

The flow control valve 15 is normally urged toward closed position by a stainless steel, coil compression spring 318, one end of which abuts the washer 293 while the other end abuts the lower face of the cover 275. The head 304 of the stem 302 extends centrally into the spring 318 and is located directly above the upper end of the rivet 289. The valve 15 is adapted to be opened, in the absence of operating fluid pressure in the chamber 281, by water under pressure in the inlet chamber 261 acting on the lower surface of the valve disc 285 and on the rivet head 291 and on the lower side of the diaphragm 279, against the bias of the spring 318. When the valve is moved to the fully open position, the upper end of the rivet 289 abuts against the lower end of the head 304, which limits the extent to which the valve can open. Thus, by adjusting the stem 302 vertically, the flow of water through the control valves 15, 17, 27, 29 and 31 can be adjusted to obtain the desired rate of discharge from the spray nozzles 47a, 47b, 47c, 47d and 47e, respectively, associated therewith. A tube 320a for operating fluid is connected to the pressure chamber 281 by a threaded fitting 322 mounted in an opening 324 in the cover 275.

In order to control the distribution of operating fluid under pressure to the respective pressure chambers of the master valve 5, the relief valve 77 and the sprinkler flow control valves 15, 17, 27, 29 and 31, and the venting of these chambers to atmosphere, a pilot valve generally designated 326 and shown in detail in FIGS. 9 to 13, is provided. The pilot valve 326 includes a body 328 secured to the lower wall 329 of a housing 330 by bolts 332. A vertically extending bore 334 is formed in the valve body 328 and terminates at the lower end thereof in an enlarged circular pressure chamber 336 formed in the lower end of said valve body. A distributor plate 338 for operating fluid is secured to the lower end of the valve body 328 by screws 340 and forms a closure for the chamber 336. A gasket 342 positioned between the distributor plate 338 and the valve body 328 provides a fluid-tight seal therebetween.

Figures 9, 13:
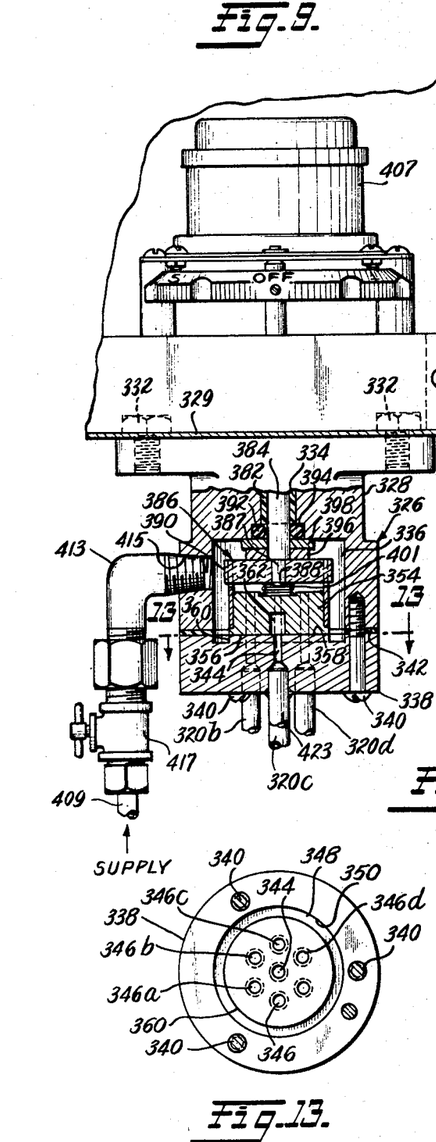
FIG. 9 is an enlarged fragmentary elevational view, partly in section of the controller and pilot valve for simultaneously, automatically controlling the master valve and the relief valve.
FIG. 13 is a horizontal sectional plan view of the distributor plate of the pilot valve, taken on the line 13—13 of FIG. 9.

The distributor plate 338, FIG. 13, has a centrally located drain passage 344 and six equally spaced distributing passages 346, 346a, 346b, 346c, 346d and 346e arranged concentric with the drain passage 344. An annular channel 348 is formed in the upper side of the distributor plate 338, concentric with the drain passage 344, and spaced outwardly from the six passages 346 to 346e. The outer wall 350 of the channel 348 is concentric and coextensive with the inner wall of the pressure chamber 336.

A pilot disc assembly 352 is mounted in the chamber 336 and includes a circular pilot disc 354 having a flat lower face 356 lapped to a flat seat or upper face 358 integral with the distributor plate 338 within the inner wall 360 of the annular channel 348. A centrally located exhaust port 362 in the pilot disc 354 is in axial alignment with the drain passage 344 and extends upwardly from the lower surface 356 thereof and connects with the inner end of a radially exhaust passage 364. A short exhaust port 366, located the same radial distance outwardly from the exhaust port 362 as are the six equally spaced passages 346 to 346e from the drain passage 344, extends upwardly from the lower surface 356 thereof and connects with the inner end of a radially exhaust passage 364. A short exhaust port 366, located the same radial distance outwardly from the exhaust port 362 as are the six equally spaced passages 346 to 346e from the drain passage 344, extends upwardly from the lower surface 356 of the pilot disc 354 to the radial exhaust passage 364. The outer end of the passage 364 is closed by a cylindrical skirt 368, FIG. 11, tightly fitting around the pilot disc 354 and seated on a shoulder 370 formed on said disc. The disc 354 and the skirt 368 are secured together and maintained in assembled relation by soldered joints 372 and 373. The port 362, passage 364 and port 366 combine to provide a U-shaped exhaust port 374, with the port 362 always aligned with the drain passage 344 of the distributor plate 338, and with the port 366 adapted to be aligned with a selected one of the six equally spaced passages 346 to 346e in the distributor 338.

Figure 10:
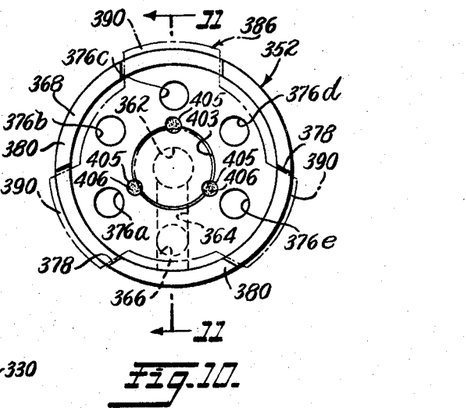
FIG. 10 is an enlarged plan view of the pilot disc assembly of the pilot valve, the driver for the assembly being shown in phantom lines.
Figure 11:
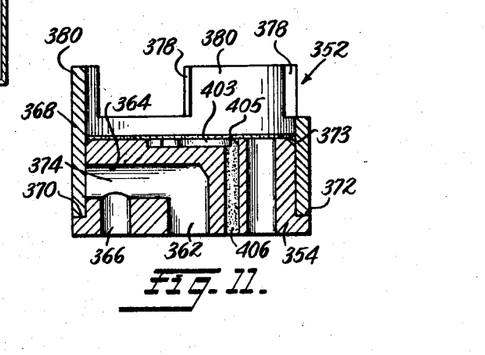
FIG. 11 is a vertical sectional view through the pilot disc assembly, taken on line 11—11 of FIG. 10.
Figure 12:
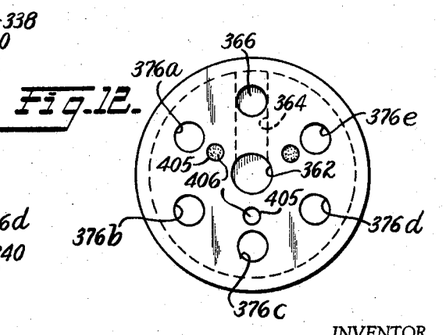
FIG. 12 is a bottom plan view of the pilot disc assembly of FIGS. 10 and 11.

The pilot disc 354 has five pressure ports 376a, 376b, 376c, 376d and 376e extending therethrough arranged concentrically with the exhaust port 362 and located the same distance radially outwardly from the port 362 as is the exhaust port 366. The five pressure ports 376a to 376e, and the exhaust port 366 are disposed 60 degrees apart and register with and cooperate with the passages 346 to 346e in the distributor plate 338 in a manner to be described below. The skirt 368 extends upwardly above the pilot disc 354 and is notched at three equally spaced positions to provide alternate recesses 378 and upstanding lugs 380.

A bushing 382 is positioned in the bore 334 in the valve body 328 and rotatably supports a drive shaft 384 for driving the pilot disc 354. A spider 386 is mounted on the lower reduced end 387 of the shaft 384 and is rigidly secured thereto by upsetting or swaging the lower end of said shaft, as at 388. The spider 386 includes three equally spaced, radially extending, drive fingers 390 which have a close, sliding fit within the recesses 378 formed in the cylindrical skirt 368.

Operating fluid under pressure is prevented from escaping from the chamber 336 along the drive shaft 384 by a resilient O-ring 392 seated in a counterbore 394 at the lower end of the bore 334. The dimensions of the O-ring 392 and of the counterbore 394 are such that the lower surface of the O-ring protrudes downwardly a short distance out of the counterbore and into the chamber 336 prior to axial compressing of the O-ring. A pair of washers 396 and 398 surround the drive shaft 384 and respectively seat on the spider element 386 and bear against the O-ring 392. A stainless steel compression spring 401 is confined between the pilot disc 354 and the spider element 386 and is seated at one end in a recess 403 formed centrally in the upper face of said pilot disc. The spring 401 urges the pilot disc 354 toward its seat 358 and simultaneously urges the spider 386 and the washers 396 and 398 upwardly, axially compressing the O-ring 392 against the shaft 384 and the walls of the counterbore 394. The drive fingers 390 of the spider 386 have a vertical sliding fit in the recesses 378 of the skirt 368, and provide a drive connection therebetween. The spider 386 is axially spaced from the pilot disc 354 to assure an ample passageway for the flow of operating fluid from the chamber 336 into the pilot disc pressure ports 376a to 376e. In order to lubricate the lapped faces 356 and 358, three equally spaced passages 405, which are formed concentric with the exhaust port 362, are provided. These passages extend through the pilot disc 354 from the flat lower face 356 thereof to adjacent the outer periphery of the recess 403 and are filled with lubricant-impregnated wicking 406.

A fully automatic time controller 407 is employed to actuate the pilot disc assembly 352, step by step. The controller 407 is mounted in the housing 330 and is designed to periodically rotate the pilot disc drive shaft 384 through an angle of 60 degrees. Since the specific construction of the controller 407 per se is known and does not form a novel part of this invention, it has not been illustrated in greater detail in the drawings than is deemed necessary to an understanding of the control effected by the pilot valve 326.

Referring to FIGS. 1 and 2 one end of a supply tube 409 for operating fluid under pressure to be distributed by the pilot valve 326 to actuate the master valve 7, the relief valve 77 and the flow control valves 15, 17, 27, 29 and 31, is connected to the inlet chamber 87 of the master valve 7 by a threaded fitting 411. Obviously, the tube 409 could alternatively be connected to the pipe nipple 65 or to the main supply pipe 1. The other end of the supply tube 409 is connected to the pressure chamber 336 of the pilot valve 326 by an elbow fitting 413 mounted into a threaded opening 415 in the side wall of the pilot valve body 328. A normally open shut-off valve 417 of any suitable type is mounted in the tube 409 to shut off the flow of operating fluid to the pilot valve 326 whenever it is found desirable to do so.

A tube 419, for conducting operating fluid from the pilot valve 326 to the master valve 7, and to the relief valve 77, is soldered or otherwise fixedly secured at one end thereof in the passage 346 in the distributor 338. The other end of the tube 419 is connected through a T-fitting 421 with the tube 136 of the master valve 7, and with the tube 192 of the relief valve 77. By means of this arrangement, the chamber 134 of the master valve 7 and the chamber 190 of the relief valve 77 are in constant communication with the tube 419 to simultaneously receive operating fluid under pressure, or to simultaneously exhaust spent operating fluid.

The pressure chamber 281 of each of the sprinkler flow control valves 15, 17, 27, 29 and 31 is connected to the distributor 338 of the pilot valve 326 by the conduits or tubes 320a, 320b, 320c, 320d and 320e, which are soldered or otherwise fixedly secured at one end in the passages 346a, 346b, 346c, 346d and 346e, respectively, and connected at the other end with the pressure chambers 281.

The central drain passage 344 in the distributor 338 is connected to atmosphere by a drain tube 423, one end of which is soldered in the passage 344. The other end of the tube 423, from which a small amount of spent operating fluid is periodically discharged, preferably extends to a suitable drain and may discharge into the pit 49.

Figure 15:
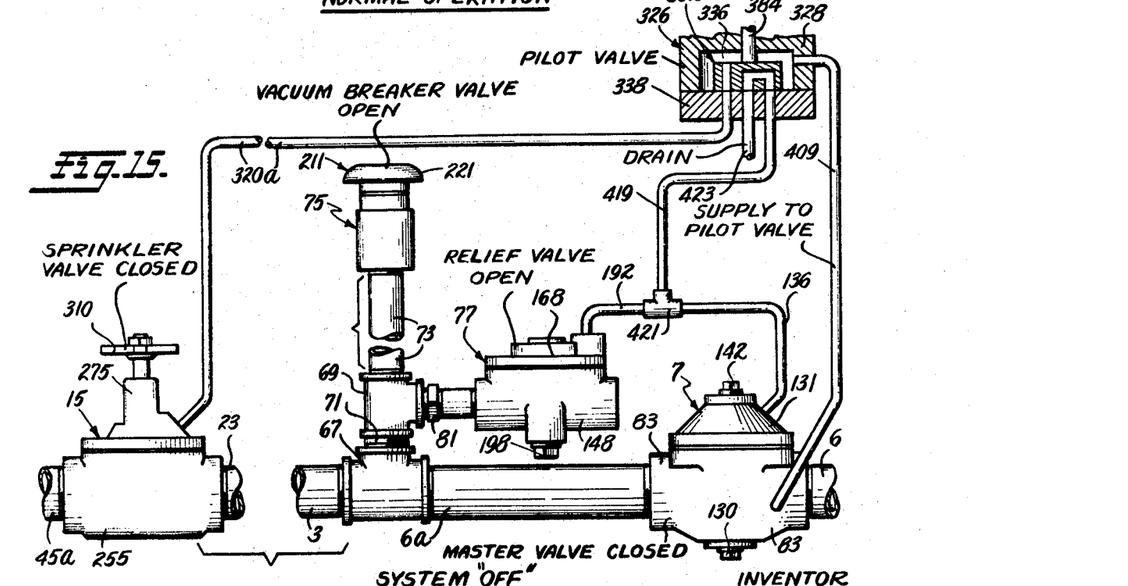
FIG. 15 is a view diagrammatically illustrating the position of the pilot disc and the relation of the control valves when the sprinkler system is "OFF" or out of operation.

The cycle of operation of the present sprinkler system is as follows:

During the OFF period of the system, the pilot valve assembly 352 is positioned with the exhaust port 366 of the pilot disc 354 in registration with the seat passage 346. This causes venting to atmosphere, through the tubes 136, 192 and 419, the U-shaped exhaust passage 374, the drain passage 344, and the drain tube 423, of the pressure chamber 134 of the master valve 7 and the pressure chamber 190 of the relief valve 77. The exhaust of operating fluid from the chamber 134 permits the master valve 7 to be closed by the spring 114 augmented by line pressure acting on the lower side of the diaphragm 118, and the exhaust of operating fluid from the chamber 190 permits the relief valve 77 to be opened by line pressure in the inlet chamber 154 acting on the lower side of the diaphragm 172 against the bias of the spring 188. At this time, the pressure ports 376a–376e in the pilot disc 354 will be in registration with the respective seat passages 346a–346e, thus allowing the pressure of the operating fluid in the chamber 336 of the pilot valve 326 to be transmitted through the tubes 320a, 320b, 320c, 320d, and 320e to the pressure chamber 281 of each of the associated sprinkler flow control valves 15, 17, 27, 29 and 31, thus maintaining all of these valves in their closed position. The closed master valve 7 cuts off the supply of water to the system, and the open relief valve 77 allows the water under pressure in the vent pipe 73 to drain to the atmosphere, without draining the distribution pipes 3, 9, 11, etc. on the upstream side of the relief valve. The relieving of pressure in the vent pipe 73 allows the vacuum breaker valve 75 to open under atmospheric pressure and by gravity, and the pressure of the water in the main distribution pipe 3 and in the lateral distribution pipes 9 and 11 is thus reduced to less than atmospheric pressure.

Figure 14:
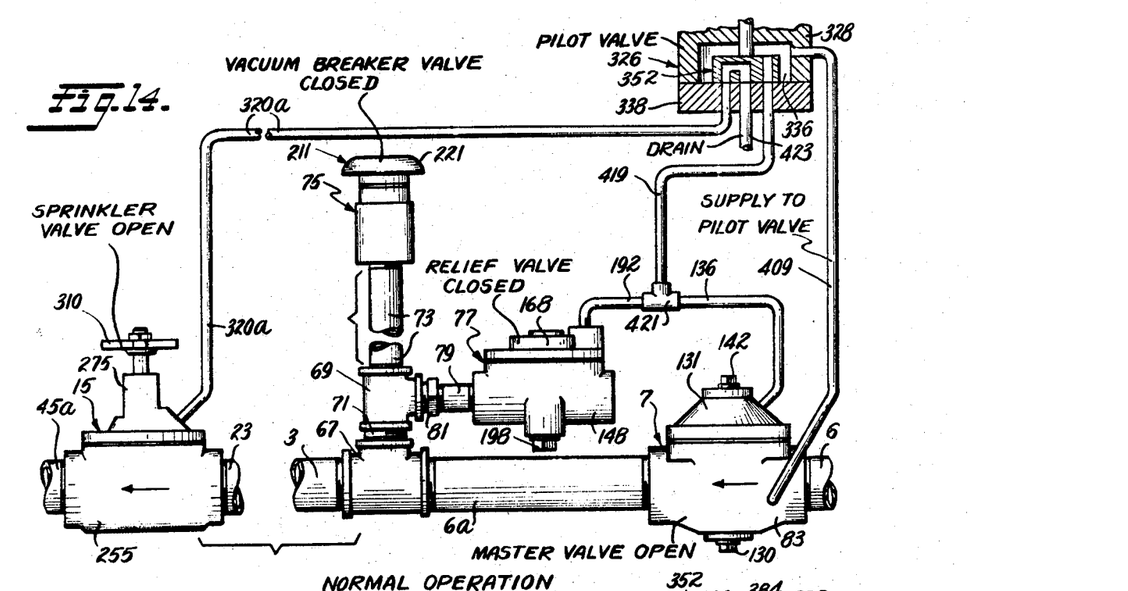
FIG. 14 is a view diagrammatically illustrating one position of the pilot disc and the relation of the control valves when the sprinkler system is in operation.

At the beginning of a sprinkling cycle, the controller 407 rotates the pilot valve assembly 352 in a clockwise direction through an angle of 60 degrees bringing the pressure port 376e into registration with the seat passage 346. Operating fluid can then flow from the pilot pressure chamber 336 through the tubes 419 and 192 to the pressure chamber 190 of the relief valve 77. This pressure, acting on the diaphragms associated with the aforesaid chambers, opens the master valve 7 and simultaneously closes the relief valve 77. The opening of the master valve admits water under pressure into the system. The closing of the relief valve 77 prevents the escape of such water from the system, and the vent pipe 73 begins to fill immediately. As the water rises in the vent pipe 73 and the pressure increases in the distribution pipes 3, 9 and 11, and in said vent pipe, the vacuum breaker valve 75 closes automatically. At this time, the exhaust port 366 in the pilot disc 354 registers with the seat passage 346a, venting to atmosphere the operating fluid in tube 320a and in pressure chamber 281 of the sprinkler flow control valve 15. The pressure of water in the inlet chamber 261 of the valve 15 acting on the under side of the valve disc 285 opens the valve 15 against the bias of the spring 318, permitting water to flow through the sprinkler pipe 45a to be discharged from the spray nozzles 47a. Thus, no appreciable watering time is lost when the system is restarted. The pressure ports 376a, 376b, 376c and 376d of the pilot disc 354, which are now in registration with the seat passages 346b, 346c, 346d and 346e, respectively, permit the operating fluid under pressure in the chamber 336 to be communicated through the tubes 320b, 320c, 320d and 320e to the pressure chamber 281 of the respective sprinkler flow control valves 17, 27, 29 and 31, to maintain these valves in their closed position.

After a predetermined period of watering time, as determined by the setting of the timing mechanism of the controller 407, the pilot valve assembly 352 is again actuated in a clockwise direction through an angle of 60 degrees, bringing the exhaust port 366 into registration with the next seat passage 346b to vent the pressure chamber of the sprinkler flow control valve 17 to the atmosphere and to permit said valve to open and water to be discharged from the spray nozzles 47b in the manner described above. At this time the pressure ports 376a, 376b, 376c, 376d and 376e in the pilot disc 354 will be in registration with the seat passages 346c, 346d, 346e, 346 and 346a, respectively, to permit the operating fluid to maintain the master valve 7 open, and to maintain the relief valve 77 and the flow control valves 15, 27, 29 and 31 closed, in the same manner previously described.

As the pilot disc 354 is successively rotated step-by-step through angles of 60°, in a clockwise direction at predetermined intervals of time by the controller 407, the remaining sprinkler flow control valves 27, 29 and 31 will be opened in succession, the same as described in connection with valves 15 and 17. At the end of a sprinkling cycle, the pilot disc 354 will be returned to its initial position and the sprinkler system will be turned OFF to assume the condition previously described.

It will be clear from the foregoing that whenever the system is OFF, the pressure is relieved in the distribution pipes 9, 11, 13, etc.; wherefore, these can be of less thickness and of a much cheaper grade than pipe that is at all times subjected to full line pressure and to the surge pressures and water-hammering incident thereto.

It will be obvious to anyone skilled in the art, that the principles of the invention can be applied to water distribution systems of any size, and that any desired number of sprinkler flow control valves and spray pipes may be controlled and actuated successively in the manner described herein by modifying the pilot valve and the distributor plate to include the appropriate number of passages. It will also be apparent that the hydraulically operated valves and control means therefor could be replaced by solenoid operated valves and a controller that would actuate switches to control the solenoid valves.

It will be understood that the present invention is not to be limited to the exact construction shown and described, but that various changes and modifications may be made without departing from the scope of the invention as defined in the appended claims.

I claim:

1. A ventable water distribution system, comprising: a master valve having an inlet for connection with a water supply pipe, said master valve also having an outlet; water distribution pipe means connected with said outlet of said master valve; a vent pipe connected with said distribution pipe means; a relief valve connected with said vent pipe at an elevation above said distribution pipe means; and means actuatable independently of the pressure conditions on the inlet side of the master valve and in said distribution pipe means connected with said master and relief valves and operable to effect closing of said master valve, to cut off the supply of water to said distribution pipe means and to simultaneously open said relief valve to relieve the pressure in said distribution pipe means through said vent pipe whenever said master valve is closed.

2. A ventable fluid distribution system, comprising: a master valve having an inlet for connection with a supply pipe containing liquid under pressure, said master valve also having an outlet; a liquid distribution pipe connected with said outlet of said master valve; an upright vent pipe connected with said distribution pipe; a relief valve connected with said vent pipe at an elevation above that of said distribution pipe; and means actuatable independently of the pressure conditions on the inlet side of the master vlave and in said distribution pipe connected with and controlling said master valve and said relief valve to effect simultaneous opening of said relief valve and closing of said master valve, and to effect simultaneous closing of said relief valve and opening of said master valve, whereby when said master valve is closed and said relief valve is open, the liquid pressure in said distribution pipe will be relieved through said vent pipe and relief valve without draining said distribution pipe, and when said relief valve is closed and said master valve is open, said distribution pipe and vent pipe will be pressurized.

3. In a fluid distribution system of the type described, a master valve having an inlet for connection with a supply pipe containing liquid under pressure, said master valve also having an outlet; a distribution pipe connected with said outlet of said master valve; an upright vent pipe connected with said distribution pipe; a relief valve connected with said vent pipe at an elevation above that of said distribution pipe; an automatic vacuum breaker valve connected with said vent pipe at a point above said relief valve; and means connected with and controlling said master valve and said relief valve to effect simultaneous opening of said relief valve and closing of said master valve, and to effect simultaneous closing of said relief valve and opening of said master valve, whereby when said master valve is closed and said relief valve is open, the liquid pressure in said distribution pipe will be relieved through said vent pipe and relief valve without draining said distribution pipe and said vacuum breaker valve will automatically open, and when said relief valve is closed and said master valve is open, said distribution pipe and vent pipe will be pressurized and said vacuum breaker valve will be automatically closed.

4. In a fluid distribution system, a master valve having an inlet for connection with a supply pipe containing fluid under pressure, said master valve having an outlet; a distribution pipe connected with said outlet; a flow control valve connected with said distribution pipe; a vertical vent pipe connected with said distribution pipe at a point between said master valve and said flow control valve; an automatic vacuum breaker valve mounted on the upper end of said vent pipe; a relief valve connected in said vent pipe at a point between said vacuum breaker valve and said fluid distribution pipe; and means simultaneously controlling said master valve, relief valve and flow control valve arranged to effect opening of said relief valve and closing of said master valve and flow control valve, and to effect closing of said relief valve and opening of said master valve and said flow control valve, whereby when said master valve is closed and said relief valve is open, the pressure in said distribution and vent pipes will be relieved and said vacuum breaker valve will open and permit draining of fluid from said vent pipe.

5. In a fluid distribution system, a fluid pressure operable master valve having an inlet for connection with a supply pipe containing fluid under pressure, said master valve having an outlet; a distribution pipe connected with said outlet; a fluid pressure operable flow control valve connected with said distribution pipe; a vertical vent pipe connected with said distribution pipe at a point between said master valve and said flow control valve; an automatic vacuum breaker valve mounted on the upper end of said vent pipe; a fluid pressure operable relief valve connected with said vent pipe at a point between said vacuum breaker valve and said fluid distribution pipe; and means connected with said fluid pressure operable master, flow control and relief valves simultaneously controlling the supply or exhaust of operating fluid to said valves to effect opening of said relief valve and closing of said master valve and flow control valve, and to effect closing of said relief valve and opening of said master valve and said flow control valve, whereby when said master valve is closed and said relief valve is open, the pressure in said vent and said distribution pipes will be relieved and said vacuum breaker valve will open and permit draining of fluid from said vent pipe.

6. In a fluid distribution system, a fluid pressure operable master valve having an inlet for connection with a supply pipe containing fluid under pressure, said master valve having an outlet; a distribution pipe connected with said outlet of said master valve; a plurality of branch pipes each containing a fluid pressure operable flow control valve connected with said distribution pipe; a vent pipe connected with said distribution pipe at a point between said master valve and said flow control valves; an automatic vacuum breaker valve connected with said vent pipe at an elevation above said distribution pipe;

a fluid pressure operable relief valve connected with said vent pipe at a point between said vacuum breaker valve and said fluid distribution pipe; and means simultaneously controlling said master valve and said relief valve arranged to effect opening of said relief valve and closing of said master valve and said flow control valves, and to effect closing of said relief valve and opening of said master valve and opening of at least one of said flow control valves, whereby when said master valve is closed and said relief valve is open, the pressure in said distribution and vent pipes will be relieved and said vacuum breaker valve will open and permit draining of fluid from said vent pipe.

7. A fluid distribution system, comprising: a normally closed fluid pressure operable master valve having an inlet to be connected with a supply pipe containing fluid under pressure, said master valve also having an outlet; a distribution pipe connected with said outlet of said main valve; a vent pipe connected with said distribution pipe; a normally open fluid pressure operable relief valve connected with said vent pipe at an elevation above said distribution pipe, said master valve being actuatable to open position by operating fluid supplied thereto and said relief valve being actuatable to and maintained in closed condition by operating fluid simultaneously supplied thereto, whereby said distribution pipe may alternately be placed in communication with fluid under pressure in said supply pipe and vented by alternately supplying operating fluid simultaneously to or exhausting said operating fluid simultaneously from, said master and relief valves; and pilot valve means actuatable independently of the pressure conditions on the inlet side of the master valve and in said distribution pipe connected with said master valve and relief valve alternately controlling the supply and exhaust of operating fluid thereto.

8. A fluid distribution system, comprising: a normally closed fluid pressure operable master valve having an inlet to be connected with a supply pipe containing fluid under pressure, said master valve also having an outlet; a distribution pipe connected with said outlet of said main valve; a vent pipe connected with said distribution pipe; an automatic vacuum breaker valve connected with said vent pipe and disposed at an elevation above said distribution pipe; and a normally open fluid pressure operable relief valve connected with said vent pipe at a point between said distribution pipe and said vacuum breaker valve, said master valve being actuatable to the open position by operating fluid supplied thereto and said relief valve being actuatable to and maintained in the closed condition by operating fluid supplied thereto, whereby said distribution pipe may alternately be placed in communication with fluid pressure in said supply and vented by alternately supplying operating fluid simultaneously to, or exhausting said operating fluid simultaneously from, said master and relief valves; and means connected with said master valve and relief valve controlling the supply and exhaust of operating fluid thereto.

9. A fluid distribution system, comprising: a fluid pressure operable master valve having an inlet to be connected with a supply pipe containing fluid under pressure, said master valve having an outlet and being normally in closed position under line pressure and being openable by operating fluid under pressure supplied thereto; a distribution pipe connected with the outlet of said master valve; a vent pipe connected between said master valve and said flow control valve; an automatic vacuum breaker valve connected with said vent pipe; a fluid pressure operable relief valve connected with said vent pipe at a point between said vacuum breaker valve and said fluid distribution pipe, and at an elevation above that of said distribution pipe, said relief valve being normally open by line pressure and being closable by operating fluid supplied thereto under pressure; and means for supplying operating fluid simultaneously to said master and relief valves to open said master valve and to close said relief valve, or exhausting operating fluid simultaneously from said master and relief valves to close said master valve and to open said relief valve to drain said vent pipe.

10. A fluid distribution system, comprising: a fluid pressure operable master valve having an inlet to be connected with a supply pipe containing fluid under pressure, said master valve having an outlet and being normally in closed position under line pressure and being openable by operating fluid under pressure supplied thereto; a distribution pipe connected with the outlet of said master valve; a fluid pressure operable flow control valve connected with said distribution pipe and normally being closed by operating fluid under pressure supplied thereto and being openable by line pressure; a vent pipe connected between said master valve and said flow control valve; an automatic vacuum breaker valve connected with said vent pipe; a fluid pressure operable relief valve connected with said vent pipe at a point between said vacuum breaker valve and said fluid distribution pipe, and at an elevation above that of said distribution pipe, said relief valve being normally open by line pressure and being closable by operating fluid supplied thereto under pressure; and means for supplying operating fluid simultaneously to said master and relief valves and exhausting operating fluid from said flow control valve to open said master valve and flow control valve and to close said relief valve, or exhausting operating fluid simultaneously from said master and relief valves and supplying operating fluid to said flow control valve to close said master valve and flow control valve and to open said relief valve to drain said vent pipe.

11. A fluid distribution system, comprising: a fluid pressure operable master valve having an inlet to be connected with a supply pipe containing fluid under pressure, said master valve having an outlet and being normally in closed position under line pressure and being openable by operating fluid under pressure supplied thereto; a distribution pipe connected with the outlet of said master valve; a plurality of fluid pressure operable flow control valves connected with said distribution pipe and normally being closed by operating fluid under pressure supplied thereto and being openable by line pressure; a vent pipe connected with said distribution pipe at a point between said master valve and said flow control valves; an automatic vacuum breaker valve connected with said vent pipe; a fluid pressure operable relief valve connected with said vent pipe at a point between said vacuum breaker valve and said fluid distribution pipe, and at an elevation above that of said distribution pipe, said relief valve being normally open by line pressure and being closable by operating fluid supplied thereto under pressure; and means for supplying operating fluid simultaneously and continuously to said master and relief valves and successively exhausting operating fluid from successive of said flow control valves to maintain said master valve open, to open said flow control valves in succession and to maintain said relief valve closed, or exhausting operating fluid simultaneously from said master and relief valves and supplying operating fluid to all of said flow control valves to close said master and all of said flow control valves and to open said relief valve to drain said vent pipe.

12. A fluid distribution system, comprising: a fluid pressure operable master valve having an inlet to be connected with a supply pipe containing fluid under pressure, said master valve having an outlet and being normally in closed position and being openable by operating fluid supplied thereto; distribution pipe means connected with the outlet of said master valve; a plurality of fluid pressure operable flow control valves connected in said distribution pipe means; a vent pipe connected between said master valve and said flow control valves; an automatic vacuum breaker valve connected with said vent pipe and disposed at an elevation above said distribution pipe means; a fluid pressure operable relief valve connected with said vent pipe at a point between said vacuum breaker valve and said fluid distribution pipe means and at an elevation above said distribution pipe means, said relief valve being normally open and being closable by operating fluid supplied thereto under pressure; and means for alternately supplying operating fluid simultaneously to, or exhausting said operating fluid simultaneously from, said master valve and said relief valve, whereby said distribution pipe means is alternately placed in communication with fluid under pressure in said supply pipe, or vented.

13. A fluid distribution system, comprising: a fluid pressure operable master valve having an inlet to be connected with a supply pipe containing fluid under pressure, said master valve having an outlet and being normally closed and being openable by operating fluid under pressure supplied thereto; distribution pipe means connected with the outlet of said master valve; a plurality of normally line-pressure-openable and fluid-pressure-closed flow control valves connected with said distribution pipe means; means for successively supplying operating fluid to, and for exhausting operating fluid from, said flow control valve: a vent pipe connected with said distribution pipe means between said master valve and said flow control valves; an automatic vacuum breaker valve connected with said vent pipe and disposed at an elevation above said distribution pipe means; a fluid pressure operable relief valve connected with said vent pipe at a point between said vacuum breaker valve and said distribution pipe means and at an elevation above said distribution pipe means, said relief valve being normally openable by line pressure and being closable by operating fluid supplied thereto under pressure; and means for alternately supplying operating fluid simultaneously to, and exhausting said operating fluid simultaneously from, said master valve and said relief valve, whereby said distribution pipe means is alternately placed in communication with fluid under pressure in said supply pipe, or vented.

14. A water distribution control system, comprising: a normally closed, fluid pressure actuated master valve having an inlet for connection with a supply pipe containing water under pressure, said master valve also having an outlet; a plurality of fluid pressure actuated flow control valves; distribution pipe means connected with said outlet of said master valve and with each of said flow control valves; a vertically disposed vent pipe connected with said distribution pipe means; an automatic vacuum breaker valve mounted on the upper end of said vent pipe and at an elevation above said distribution pipe means; a relief valve of a type which is fluid pressure actuated-to-close connected with said vent pipe and disposed at an elevation above said distribution pipe means and below said vacuum breaker valve; a pilot valve controlling the flow of operating fluid to and from said master valve, said flow control valves, and said relief valve, respectively, said pilot valve having a chamber for operating fluid under pressure and an inlet for said operating fluid leading to said pressure chamber; an operating fluid supply line connecting said inlet of said pilot valve with the inlet side of said master valve for conducting operating fluid to said pressure chamber of said pilot valve; conduit means connecting said pilot valve with said master valve and with said relief valve for conducting operating fluid from said pilot valve to said master and relief valves; and a plurality of tubes for operating fluid each connected with said pilot valve and with a different one of said flow control valves, said pilot valve having ports arranged to simultaneously supply operating fluid under pressure to all of said tubes to maintain all of said flow control valves closed while exhausting operating fluid through said conduit means to close said master valve and open said relief valve to drain said vent pipe, and to successively exhaust operating fluid through said tubes one at a time while applying operating fluid pressure to all other tubes to maintain closed the flow control valves associated therewith to allow opening and closing of said flow control valves in sequence while also continuously applying operating fluid pressure through said conduit means to maintain said master valve open and said relief valve closed while said flow control valves are being sequentially opened and closed.

References Cited
UNITED STATES PATENTS

| | | | |
|---|---|---|---|
| 2,620,816 | 12/1952 | Griswold | 137—218 |
| 2,875,428 | 2/1959 | Griswold | 239—69 X |
| 3,048,274 | 8/1962 | Lundeen | 251—61 X |

FOREIGN PATENTS

| | | |
|---|---|---|
| 442,387 | 4/1912 | France. |

WILLIAM F. O'DEA, *Primary Examiner.*

D. LAMBERT, *Assistant Examiner.*

UNITED STATES PATENT OFFICE
CERTIFICATE OF CORRECTION

Patent No. 3,386,460　　　　　　　　　　　　　　　　June 4, 1968

Ralph K. Dean

It is certified that error appears in the above identified patent and that said Letters Patent are hereby corrected as shown below:

Column 3, line 46, after "45b," insert -- 45c, --; line 48, after "with" insert -- a --. Column 8, lines 20 to 26, cancel "A short exhaust port 366, located the same radial distance outwardly from the exhaust port 362 as are the six equally spaced passages 346 to 346e from the drain passage 344, extends upwardly from the lower surface 356 thereof and connects with the inner end of a radially exhaust passage 364.". Column 11, line 63, "vlave" should read -- valve --.

Signed and sealed this 25th day of November 1969.

(SEAL)
Attest:

Edward M. Fletcher, Jr.　　　　　　　　　　　　　WILLIAM E. SCHUYLER, JR.
Attesting Officer　　　　　　　　　　　　　　　　　　Commissioner of Patents